United States Patent Office 3,194,467
Patented July 13, 1965

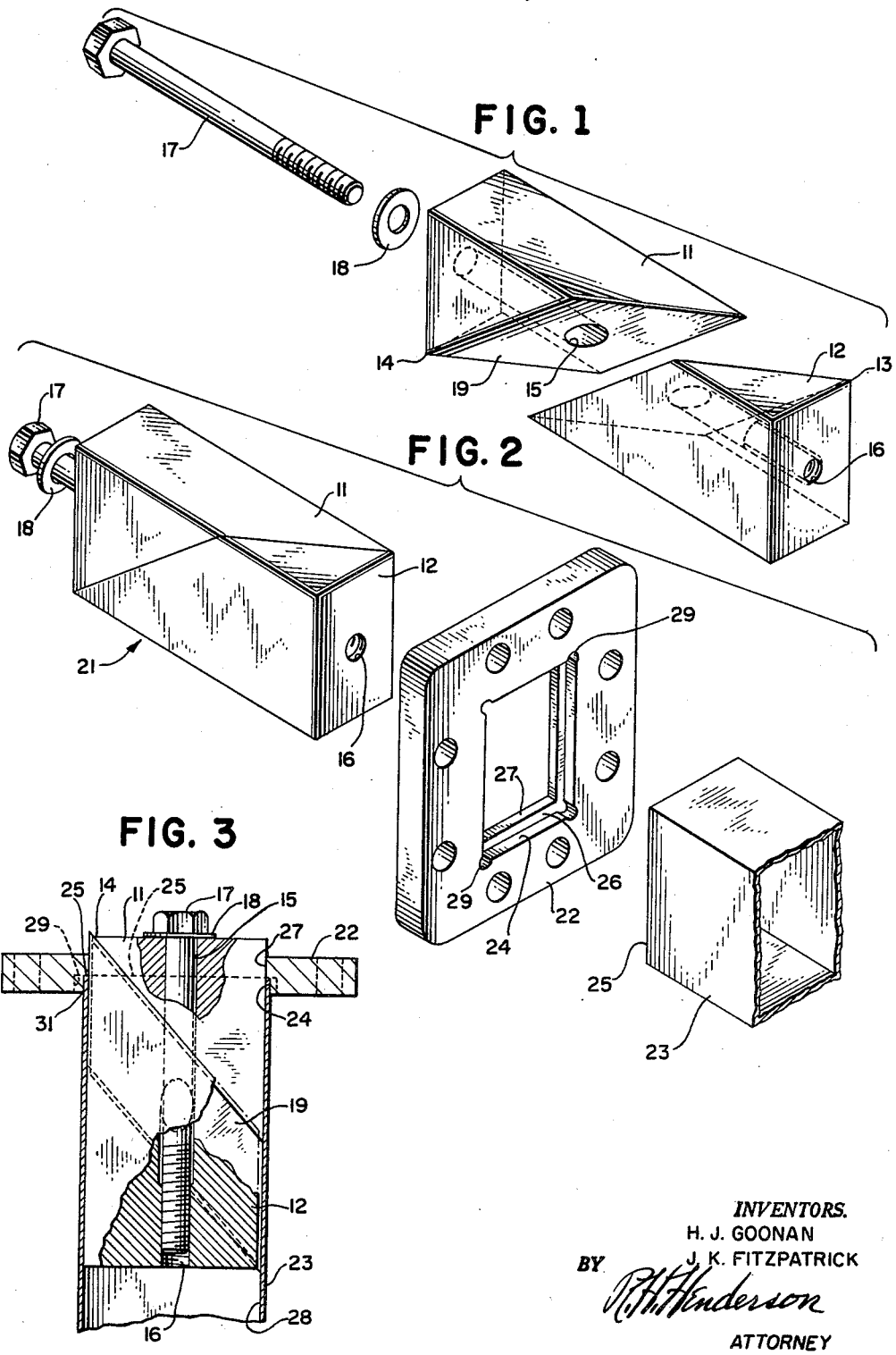

3,194,467
WAVEGUIDE FLANGING SYSTEM
Harry J. Goonan, Brooklyn, and James K. Fitzpatrick, New York, N.Y., assignors to The Western Union Telegraph Company, New York, N.Y., a corporation of New York
Filed Jan. 30, 1962, Ser. No. 169,786
3 Claims. (Cl. 228—50)

This invention relates to the flanging of microwave plumbing, and more particularly to novel method and means to apply flanges with accuracy and speed to the extremities of a rectangular waveguide in an improved manner.

It is common in microwave technology to solder or braze companion flanges onto abutting ends of the sections of hollow tubing used in the transmission of such high frequency energy. For radar applications such flanges usually are constructed in the form of a choke joint, because such a joint is relatively non-critical as to the alignment or even the closeness of connection of the flanges.

When it is desired to employ microwave carriers for communication purposes where a very large number of channels are to be modulated onto one or more carriers simultaneously, however, such as now occurs in common carrier communication networks, it is found that the resulting bandwidth occupied by the signal exceeds the capabilities of the choke joint because the widest band of essential resonance for which it can be designed is exceeded by that of the signal.

Under these circumstances, the excellent electrical matching properties of the choke joint are unavailable for this service, and recourse has been had to a simple flanged joint using companion flanges soldered to the guides, and which have plane surfaces completely across the mating faces.

With such a construction extreme accuracy of manufacture and assembly becomes of paramount importance, since not only does leakage of energy occur through even the slightest imperfections of flange face surfaces but reflections of the traveling waves in the guide are produced by any obstruction, step, or discontinuity of the wave guide aperture in traversing the joint.

Such reflections, although tolerable to a degree in other microwave systems, are highly undesirable in the application described because of their severe effect in introducing distortion and noise from the phase aberrations resulting from multipath transmission in the guide due to ziggagging of waves between multiple discontinuities.

Efforts to overcome this difficulty have included mounting the flange not at the end of the guide, but merely close to the end, and then machining off the protruding portion of the guide together with a portion of the flange to produce a plane surface. Aside from the obvious great expense of such a procedure, it is inapplicable to assemblies longer than a moderate maximum length, and at best maintains only the existing internal dimensions of the guide, which may not be adequate, as later set forth.

Another, and more widely used approach to this problem has been to employ a flange having an aperture in the face which is accurately broached to the nominal internal dimensions of the waveguide, and having a recess in the rear, in the nature of a socket or counterbore, for receiving the waveguide against a shoulder. The waveguide is then soldered into the socket by the application of moderate heat, and the introduction of soft solder in the joint between guide and recess on the outside, while the assembly is hot.

Three salient difficulties are encountered in this procedure. Since the guide end can not be cut perfectly square, solder flows into the guide through the imperfections of fit to form obstructing and reflecting occlusions. The imperfections of fit of the waveguide end constitute reflecting discontinuities of the waveguide inner surface, in and of themselves. Waveguides are extruded shapes, and while reasonably close tolerance on internal dimensions usually are maintained, they can vary by a significant amount between samples made by different dies, and even between samples made from the same die, so that when abutted, a serious discontinuity also can occur from this cause.

We have discovered that by employing a novel method of affixing this latter type of flange to the guide with the aid of a simple and convenient device which we have discovered, all of the above difficulties can be completely overcome, and the installation of flanges accomplished very accurately and expeditiously, even as a field procedure, without the need for any substantial experience or skill on the part of the installer.

It is therefore an object of this invention to provide a method and means for flanging a joint in a rectangular waveguide wherein solder occlusions are prevented.

It is another object of the invention to provide for the accomplishment of such a joint wherein discontinuities of the integrity of the waveguide wall surfaces do not occur.

It is another object of the invention to provide for the accomplishment of such a joint wherein waveguides of the same nominal but differing actual internal dimensions are connected with a smooth juncture having a very low voltage standing wave ratio in both directions.

It is a further object of the invention to provide for these things in a simplified manner not requiring substantial skill or experience on the part of the operator in order to develop such advantages.

It is a further object of the invention to reduce the time and effort required to produce a satisfactory waveguide joint.

It is a still further object of the invention to provide a simple and efficient waveguide flanging tool for the accomplishment of the above objectives.

These objects we accomplish by a system of waveguide flanging which will be understood from consideration of the following specific illustrative example of the best method known to us for the practice of the invention, as will be more clearly understood by reference to the appended drawings wherein:

FIG. 1 is an exploded view of a portion of the invention;

FIG. 2 is an exploded view of an assembly comprising a portion of the invention; and FIG. 3 is a partially sectional view of an assembly involved in the practice of the invention.

Referring now to the drawings, there is seen in FIG. 1 an exploded view of the expansible plug which is used for the convenient practice of the instant invention.

Truncated portions 11 and 12 of a rectangular parallelopiped made of strong material such as brass are separated by a through cut on a plane through diagonal corners 13 and 14. A longitudinal hole of generous clearance dimension is located axially of the part 11 and continued as a counterbore into the part 12 up to the threaded portion 16 in a coaxial hole of smaller diameter.

A cap screw 17 through the washer 18 transfixes this assembly, engaging the threads of 16 to crowd together the portions 11 and 12. The surface 19 of the above described cut on the portion 11, and its counterpart on the portion 12 are smoothly finished and may be lubricated so that application of compressive force by the screw 17 is readily able to cause sliding of the parts along this surface.

FIGURE 2 shows the assembly just described denominated 21, and a waveguide terminal flange 22, and the end of a section of waveguide 23 to which the flange is to be applied. The recess 24 into which waveguide 23 is to be soldered necessarily provides a loose fit when assembled on the waveguide, because of the necessity of a clearance spaced for the solder to enter, and because of the variability of the dimensions of the guide. The cut end 25 of the waveguide is seldom precisely square, and therefore does not seat perfectly against the accurate bottom surface 26 of the recess 24. It is not unusual for at least one of the four cut sides of waveguide 23 to fail to bottom on the surface 26, leaving a gap between the inner guide surface and the accurately broached extension surface 27 of the flange 22.

When the above described components of the exploded view of FIG. 2 are assembled and the screw 17 tightened, an assembly as depicted in FIG. 3 results. It will be observed that the portion 11 is offset from the portion 12 because of having slid diagonally under pressure from the screw 17 so that guide 23 is pressed firmly against the walls 24 of the flange 22, so that the inner surface 28 of the guide is at all points in line with the broached (or otherwise accurately sized) surface 27 of the flange 22. This is despite the fact that the guide 23 may have had internal dimensions somewhat smaller than those of the surface 27 before its expansion by the tightening of screw 17. Such tightening is made sufficient that flange 22 is firmly secured to guide 23, and the assembly may be inverted, or handled in any position without loss of the flange, and in fact the flange may be so applied in the inverted position to a downwardly depending guide end without difficulty, which often will constitute a great convenience.

It will be apparent, however, that under the described conditions of an expanded fit of the guide 23 into the flange 22 it is not to be expected that solder will be able to flow between them to form a seal, and that soldering will occur only as an external fillet therebetween when applied at their junction. This is entirely adequate for purposes of strength and retention of accurate fit, however.

At 29 in FIG. 2, there is seen a cylindrical extension of the corners of the recess 24, as may be made by the runout of an end milling cutter in forming the recess. Such corner extensions are not filled by insertion of the waveguide, and therefore constitute wells whereby solder may be led to the bottom surface 26 of the flange 22 after assembly as in FIG. 3. It is by this means that an irregularly cut waveguide end is enabled to be provided with a flush internal surface extension entirely through the flange 22, by providing access means for the solder to flow to this area.

It should be noted that for the purposes above described, it is necessary that solder shall not adhere to the members 11 and 12. They may be chromium plated if made of brass, or constructed entirely of aluminum alloy to secure this end. In addition, or alternatively, it is convenient to apply a parting material such as a silane grease, to their exterior guide contacting surfaces in advance of assembly as shown in FIG. 3.

When assembled as shown, the heating of the joint may be accomplished quite satisfactorily for L-band sizes with an ordinary electric hot plate in three or four minutes, with a great advantage over the use of a torch in convenience, safety and cost of equipment, as well as preservation of the external appearance of the components. If enhanced structural resistance of the joint is desired, this method of heating is entirely applicable to the introduction of commercially available high strength, low temperature solder to the hot joint as a fillet at junction 31 and into the wells 29.

The expandable plug of FIG. 1 is also usable as a movable and setable plug for terminating a waveguide used as a stub, in which use it provides a conveniently adjustable tuning means for the stub, during periods when it is not in use for the purposes of this invention or as a separate and distinct utility for the device.

Although this invention has been described in terms of a specific illustrative example thereof, it will be apparent to those skilled in the art that various modifications and elaborations of the example described may be accomplished without however departing from the essential spirit of the invention and it is therefore intended that the invention be limited only by the appended claims.

What is claimed is:

1. Means for installing the end of a rectangular waveguide in the recess of a recessed waveguide coupling flange which has an aperture accurately sized to the maximum inside tolerance dimensions of the waveguide, and which has enlarged portions of the recess at the corners of the waveguide in order to maintain a smooth and continuously conductive interior surface through the waveguide and to the mating face of the coupling flange which comprises:
  (A) first and second blocks having right dihedral angles placeable along opposite interior corners of the waveguide when the waveguide is assembled on the flange;
  (B) side portions on each of said blocks having dihedral elements for contacting relatively extensive portions of waveguide interior wall area including the waveguide and including together substantially all of the end;
  (C) said blocks being of a size sufficiently large to provide substantial overlapping within the cross section of a waveguide;
  (D) said blocks having abutting smooth surfaced and readily mutually slidable ends in the overlapping region defined by a plane skewed in respect to all axes of the waveguide;
  (E) and means to urge the blocks together in skew sliding and waveguide wall stretching relationship; whereby the waveguide is caused to substantially fill the recess of the flange so that solder applied in the enlarged portions of the recess of the coupling flange will flow between the end of the waveguide and the seat of the recess to form a smooth interior wall surface.

2. Means for producing a sized and smooth walled microwave waveguide flanged joint which comprises a rectangular parallelopiped of heat resisting material having a plane cut completely through the body and through a pair of diagonally opposite corners thereof to form a pair of members, one of said members having an axial clearance hole, the other of said members having a tapped central hole, and a bolt through the axial clearance hole and engaging the tapped central hole for drawing the members together.

3. Tool means comprising microwave waveguide junction means for rectangular waveguide end joining which consists of a pair of substantially waveguide end-filling members of a material relatively strong in compression, said members being complementary in having an exterior surface of each lying in a plane diagonal to the waveguide axis, said surfaces being sufficiently smooth to promote mutual member sliding under conditions of member compression, and compression means intercoupling said pair of members for causing diagonal member sliding by means of member compression axially of the waveguide whereby diagonal member sliding effects undistorted lateral stretching of a filled waveguide end.

References Cited by the Examiner

UNITED STATES PATENTS

| | | | |
|---|---|---|---|
| 137,027 | 3/73 | Redheffer et al. | 113—103 |
| 284,641 | 9/83 | Klein | 113—103 |
| 1,476,983 | 12/23 | King | 153—80 |
| 2,767,676 | 10/56 | Johnson et al. | 113—103 |
| 2,998,836 | 9/61 | Hitz | 153—63 |
| 3,048,913 | 8/62 | Ball | 29—155.5 |
| 3,083,444 | 4/63 | Mitchell et al. | 29—155.5 |
| 3,102,502 | 9/63 | Seeloff | 153—80 |

MICHAEL V. BRINDISI, *Primary Examiner.*

JOHN F. CAMPBELL, *Examiner.*